I. H. Palmer.

Freight Car.

No 3527 Reissued June 29. 1869.

Witnesses,
Geo. A. Harrison
N. K. Ellsworth

Munn & Co
Attys for
Isaac H. Palmer
Per O. Knight
Supt.

THE NORRIS PETERS CO., WASHINGTON, D. C.

United States Patent Office.

ISAAC H. PALMER, OF LODI, WISCONSIN.

*Letters Patent No.* 65,826, *dated June* 18, 1867; *reissue No*, 3,527, *dated June* 29, 1869.

IMPROVED DEVICE FOR UNLOADING GRAIN-CARS.

The Schedule referred to in these Letters Patent and making part of the same.

*To all whom it may concern:*

Be it known that I, ISAAC H. PALMER, of Lodi, in the county of Columbia, and State of Wisconsin, have invented a new and improved Device for Unloading Grain; and I do hereby declare that the following is a full, clear, and exact description of the construction and operation of the same, reference being had to the accompanying drawings, making a part of this specification, in which—

Similar letters indicate corresponding parts in the several figures.

In this invention, the cars are adapted to be unloaded through their floor, by means of a series of openings in the floor, and a sliding cover, which, when in one position, closes the outlets, and when in another, opens them.

To enable others skilled in the art to which my invention appertains, to fully understand and use the same, I will proceed to describe it in detail.

A represents the sides and ends of an ordinary freight-car.

C represents a door-way, and

B, a door in the sides of the same.

*a* represents boards or planks placed across the door ways, to confine the grain while the doors are removed, for the purpose of admitting the load and of discharging it.

*b b c* represent valves, or doors in the floor of the car, the two former being slides, with two or more apertures, *d*, and the latter being a pivoted valve, or door, with its axis running either vertically, or crosswise, or lengthwise of the car.

Figure 1:
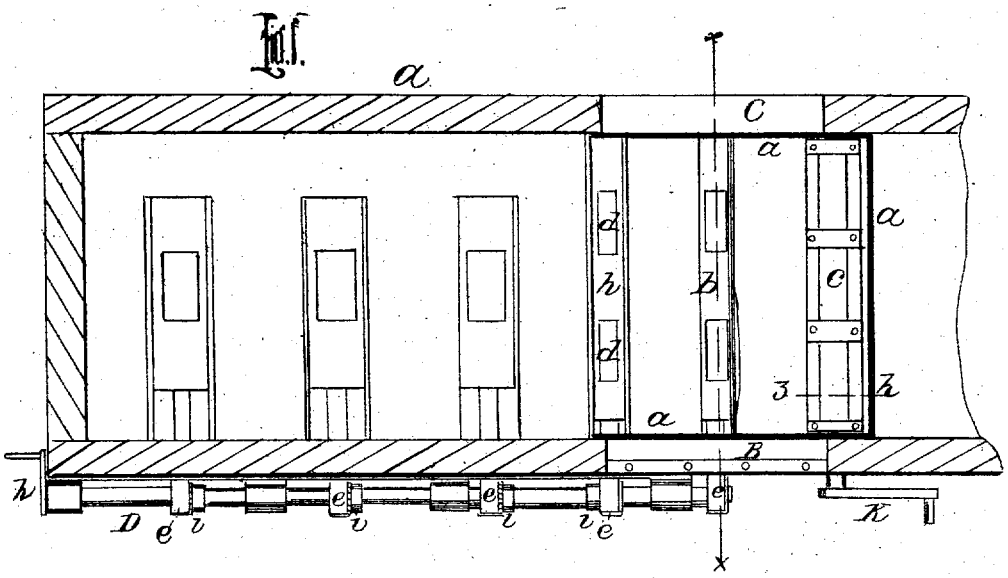
Figure 1 is a longitudinal horizontal section in the line *y y*, fig. 2.
Figure 2:
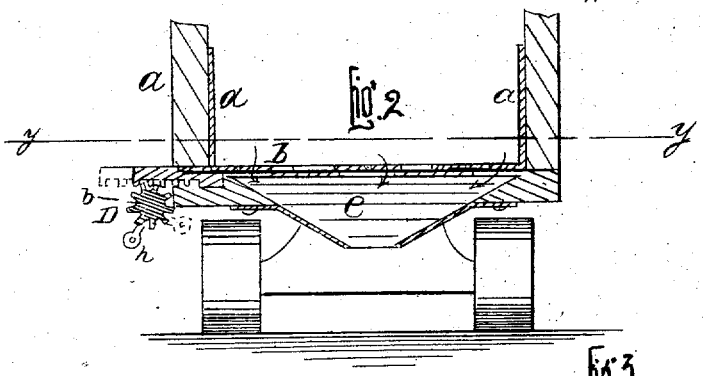
Figure 2 is a transverse vertical section in the line *x x*, fig. 1, showing the arrangement of the slides.
Figure 3:
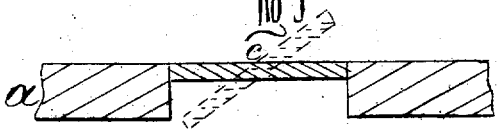
Figure 3 is a transverse horizontal section in the line *z z*, fig. 1, showing the arrangement of the pivoted valve, or door.

In the floor, under the slides *b*, are apertures, (two or more,) as shown in fig. 2, so placed that when the slides are wholly within the car, said apertures are covered, but may be made to correspond with those in the slides, by drawing the latter out a certain distance.

The valve, or door *c* covers an aperture of nearly equal size with itself, which is opened by turning the valve, or door on its axis.

D represents a shaft, placed in suitable bearings in one side of the car-bottom.

The shaft at one extremity, at the end of the car, is provided with a crank, *h*.

*e* represents racks projecting from the ends of the slides *b*, and gearing, with pinions *i*, on the shaft D.

When it is desired to draw out the slides *b*, for the discharge of the load, it is only necessary to rotate the shaft D, by means of the crank *h*, a suitable distance.

The door, or valve *c* is also provided with a crank, *k*, for a similar purpose.

*l* represents a hopper, extending lengthwise under the floor of the car, far enough to receive all the grain that may pass through the valves, doors, or openings.

Tubes are to be attached to the under side of said hopper, to conduct the grain to the desired point.

The hopper and tubes may, however, be omitted, and inclined boards, or sheet-iron, or canvas chutes, may be employed to direct the grain under the cars, and may be removed when not wanted.

It is, of course, entirely immaterial what may be the form, construction, or operation of the valves in the floor, the invention not being limited to any details, but including the broad principle of openings in the bottoms of the cars, for the grain to escape through, when used in connection with any kind of covers for closing the openings, no matter how the covers may be brought over the openings or removed therefrom, and no matter how the openings and covers may be arranged.

For instance, a row of openings longitudinal with the car might be employed, extending the whole length of the car, or only a part of its length. So, too, the openings and covers might be constructed and arranged like the registers of ventilators, hot-air furnaces, &c., so that by turning the cover on its vertical axis, it would expose the holes, and let the grain through the floor.

The shafts D may also be placed at the ends of the car, or under the same, and may extend in any convenient direction.

All these devices are obviously but modifications of my invention, and are claimed as coming within the scope of the same.

So, too, each cover may have any number of holes *d d*, and any desired number of openings and covers, and any desired number of rows thereof may be used.

The covers *b b c* may be made of iron, wood, or both combined, or of any other suitable material.

Having thus described my invention,

What I claim as new, and desire to secure by Letters Patent, is—

1. A series of holes in the car-floor, in combination with sliding covers or gates *b b*, having holes *d* in them, and so arranged, with relation to the holes in the car-floor, that when in one position they will close said holes, but when in another, will open them, substantially as and for the purpose set forth.

2. The slide-valves *b*, in combination with the racks *e*, pinions *i*, and shaft D, substantially as described.

3. The pivoted valve *c*, in combination with crank *i*, substantially as described.

Witnesses: ISAAC H. PALMER.

CHARLES O. CLEMANS,

S. J. ANDREWS.